United States Patent [19]

Magosch et al.

[11] 3,960,686

[45] June 1, 1976

[54] METHOD FOR PREPARING LOW PILLING EFFECT POLYESTER FIBER PRODUCTS

[75] Inventors: Karl Heinz Magosch; Roland Feinauer; Jorn Ruter, all of Marl, Germany

[73] Assignee: Chemische Werke Huls Aktiengesellschaft, Marl, Germany

[22] Filed: Dec. 27, 1974

[21] Appl. No.: 536,987

[30] Foreign Application Priority Data

Jan. 4, 1974 Germany............................ 2400317

[52] U.S. Cl...................... 204/159.19; 260/75 R; 264/22; 264/176 F
[51] Int. Cl.²......................................... C08G 18/00
[58] Field of Search.................... 264/176 F, 210 F; 260/79 R, 79 M, 79 T; 204/159.19

[56] References Cited
UNITED STATES PATENTS

| | | |
|---|---|---|
| 3,102,323 | 9/1963 | Adams............................. 264/290 T |
| 3,329,758 | 7/1967 | Morgan............................ 264/290 T |
| 3,335,209 | 8/1967 | Morgan............................ 264/290 T |
| 3,525,754 | 8/1970 | Berezin............................ 260/75 R |
| 3,594,350 | 7/1971 | Lofquist et al.................... 260/75 R |
| 3,852,247 | 12/1974 | Vizurraga........................ 260/75 R |

*Primary Examiner*—Jay H. Woo
*Attorney, Agent, or Firm*—Gilbert L. Wells

[57] ABSTRACT

An improvement in the process of melt spinning ethylene terephthalate polyester to produce textile fibers with decreased pilling in the threads, fibers or fabrics made therefrom. The ethylene terephthalate is melt polymerized in the presence of a condensation catalyst to a final temperature of about 250°–300°C and a final pressure of less than 10 mm mercury to form an anhydrous melt. A substituted cyclobutanedimethanol, preferably 2,4-diphenyl-cyclobutanedimethanol-1,3, is added to the melt-polymerization at a concentration of about 0.05 – 5 mole percent of the substituted cyclobutanedimethanol component. Melt spinning of the modified polyester is carried out and the fibers are irradiated with high energy light.

8 Claims, 1 Drawing Figure

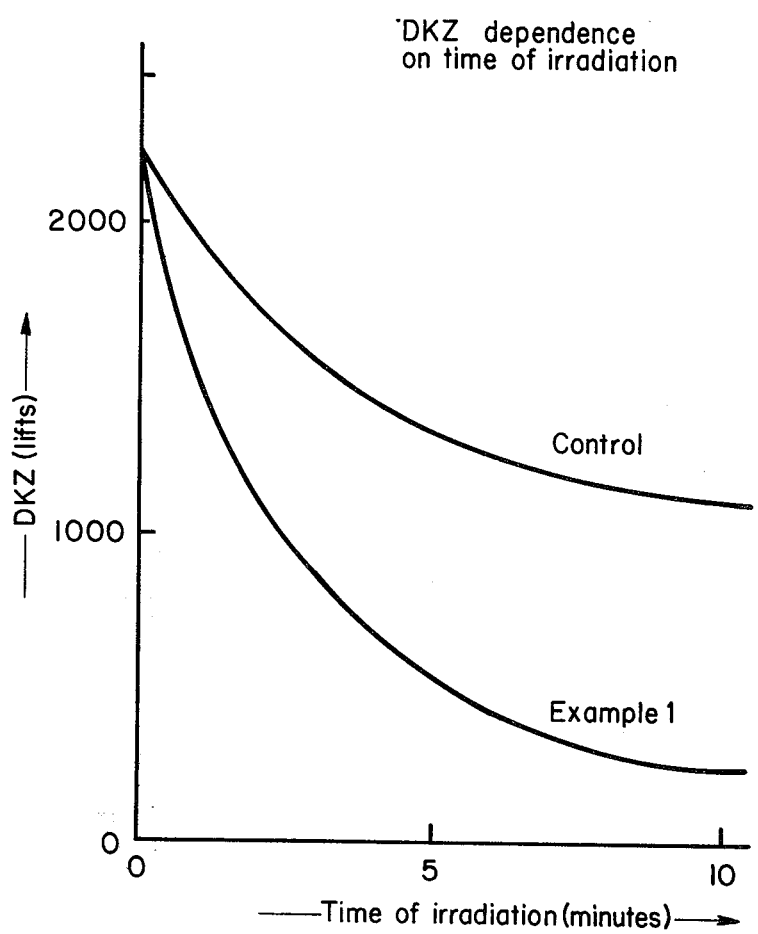

METHOD FOR PREPARING LOW PILLING EFFECT POLYESTER FIBER PRODUCTS

CROSS REFERENCES TO RELATED APPLICATIONS

Applicants claim priority under 35 U.S.C. 119 for application P 2400 317.6, filed Jan. 4, 1974 in the Patent Office of the Federal Republic of Germany.

The disclosure of applicants' copending application Ser. No. 495,074, filed Aug. 5, 1974 is incorporated herein to show the state of the art of preparing low pilling effect polyester fiber products by adding a substituted cyclobutanedicarboxylic acid to the ethylene terephthalate melt.

The disclosure of applicants' copending application Ser. No. 536,988, filed Dec. 27, 1974 is incorporated herein to show the state of the art of preparing low pilling effect polyester fiber products by adding a vinyl copolymer having more than two carboxyl and/or hydroxyl groups.

BACKGROUND OF THE INVENTION

The field of the invention is synthetic resins from polyhydric alcohol-polycarboxylic acid reaction products. The invention is particularly related to a process for the manufacture of low pilling effect polyester fiber products.

The state of the art of the present invention may be ascertained by reference to the Kirk-Othmer "Encyclopedia of Chemical Technology", Vol. 16 (1968), pages 143–159, under the section entitled "Polyester Fibers"; U.S. Pat. No. 2,465,319 which shows the preparation of polyethylene terephthalate; U.S. Pat. No. 3,391,123 of Stedley which issued July 2, 1968 and shows the state of the art of improving the pilling effect of polyethylene terephthalate textile fibers; and "Tetrahedron" 24(5), pp. 2183–2192 (1968) as reported in Chemical Abstracts, Vol. 68, p. 77457 r which discloses the preparation of the 2,4-diphenyl-cyclobutanedimethanol-1,3 preferred for use in the present invention, the disclosures of which are incorporated herein.

The present invention is particularly concerned with a further development of the method for preparing low pilling polyester fiber products, wherein yarns, fibers or fabrics made from polyesters containing from 0.1 to 5.0 mole percent referred to the acid component of substituted cyclobutanedicarboxylic acid, are irradiated with high energy light, as disclosed in U.S. patent application Ser. No. 495,074.

Because of the great number of outstanding properties, such as high melting point, resistance to chemicals, heat, hot water and light, and further because of their mechanical properties, yarns and fibers made from polyethyleneterephthalate have become of great significance in the textile industry.

In spite of the many advantages, however, polyester fibers also suffer from drawbacks. One of these is the so-called pilling effect. It is caused by fibers being pulled out of the fabric when the latter is worn, these fibers twisting into small spheres solidly anchored in the fabric. The fabric surface thereby assumes an unpleasant appearance, and the quality of the apparel is therefore decreased.

Many attempts have been undertaken to remedy this drawback of polyesters by a number of means.

The most frequently applied prior art method consists in reducing the polyester molecular weight, in obtaining correspondingly reduced specific viscosities (hereinafter abbreviated to RSV) of about 0.35 to 0.45 dl/gm (deciliters per gram as measured at a concentration of 0.23 g. in 100 ml phenol-tetrachloroethane 60/40 at 25°C), with a resulting decrease in yarn strength as disclosed in Japanese Patent No. 24,932/65. However, the melt-spinning of such a material provides serious difficulties, the melt being of very low viscosity.

Another method of preventing pilling is to prepare polyesters containing such compounds as alcohols or carboxylic acids with three or more functional groups, for instance glycerin, pentaerythrite or trimesic acid, as disclosed in German Offenlegungsschrift No. 1,928,436. Partially branched polyesters are obtained in this manner. This method suffers from the drawback that very precise dosage of the branched components is required, and this is not always feasible or carried out in industrial applications. There is the danger of reticulating the polyester, so that the entire polycondensation equipment might fail.

Already several attempts have been made to chemically change the surface of polyester fibers and also fabrics made therefrom, by treating them with water, soda, ammonium, hydrazine, amines, carboxylic acids or alcohols at elevated temperatures, as disclosed in Czech Patent No. 108,639; Dutch Patent No. 91,330; French Patent No. 1,551,050; Japanese Patent No. 7,122,174; and German Auslegeschrift No. 1,024,482. It has been found, however, that such a decay or degradation may be controlled only with serious difficulties, and that reproducibility is difficult. In many instances, it has been attempted to produce weak spots in the molecule by building in chain links with hetero-atoms, especially silicon, as disclosed in U.S. Pat. No. 3,335,211 and German Auslegeschrift No. 1,273,123, with boron, as disclosed in U.S. Pat. No. 3,391,123 and German Auslegeschrift No. 1,469,127, or with aluminum, as disclosed in German Offenlegungschrift No. 1,545,039. These attempts also lead to branching or reticulation, hydrolytic dissociation being subsequently feasible at these weak spots. Again reproducibility of results is difficult according to this method. Also, the operation must be wholly water free until the desired hydrolytic dissociation. It is generally known that the latter requirement provides considerable limitations.

As clearly shown by the above, all of the known processes suffer from a series of drawbacks.

SUMMARY OF THE INVENTION

Having in mind the limitations of the prior art, it is an object of the present invention to develop an improved process for the manufacture of low pilling effect polyester fibers.

This object is achieved in the present invention by irradiating threads, fibers or fabrics made of polyesters containing from about 0.05 to 5.0 mole percent of a substituted cyclobutanedimethanol, by means of high energy light.

Aside from its content in substituted cyclobutanedimethanol, the polyester suited for the present process consists wholly or predominantly of polyethyleneterephthalate. The latter may be modified with up to 15 mole percent of other dicarboxylic acids such as isophthalic acid; 1,5- or 2,6-naphthalenedicarboxylic acid; cyclohexanedicarboxylic acid-1,4; adipic acid or sebacic acid and/or other diols such as 1,4-dimethylolcyclohexane; butanediol-1,4; neopentylglycol; hexanediol-1,6; or 3,3,5-trimethylhexanediol-1,6.

The polyester contains from 0.05 to 5 mole percent, preferably from 0.1 to 2.0 mole percent of a substituted cyclobutanedimethanol, said figures referring to the acid component, preferably 2,4-diphenyl-cyclobutanedimethanol-1,3 of the following formula:

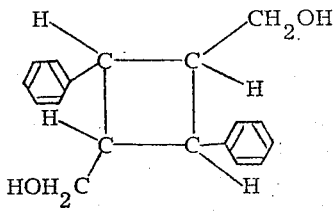

where the cyclobutanedimethanol is condensed into the polyester.

In addition to 2,4-diphenyl-cyclobutanedimethanol-1,3, the following substituted cyclobutanedimethanols are useful in the present invention:

3,4-diphenyl-cyclobutanedimethanol-1,2, the phenyl-Substituted derivatives of 2,4-diphenyl-cyclobutanedimethanol-1,3 and 3,4-diphenyl-cyclobutanedimethanol-1,2 (containing one or more methyl and/or ethyl groups, methoxy or ethoxy groups, halogens such as chlorine and bromine, e.g.).

The preparation of the polyesters useful in the present invention falls outside the object of the present invention. They are prepared as disclosed in U.S. Pat. Nos. 2,465,319 and 3,391,123, in the presence of conventional ester interchange catalysts such as calcium acetate, zinc acetate, manganese acetate or of polycondensation catalysts such as compounds of antimony, germanium or gallium, and may contain further additions of conventional heat and oxidation stabilizers such as sterically hindered phenols, secondary aromatic amines, sensitizers such as benzophenone or benzoine derivatives, or pigmenting means such as titanium dioxide.

The substituted cyclobutanedimethanols, for instance 2,4-diphenyl-cyclobutanedimethanol-1,3, is added to the reaction ingredients at an arbitrary time and preferably this addition takes place prior to esterification.

Especially ultra-violet light, particularly that with wave lengths from about 250 to 400 millimicrons, is suitable as the high energy light.

The polyesters obtained thereby are extrusion spun in conventional manner, as disclosed in U.S. Pat. No. 3,391,123. Appropriately, the fibers or threads are first stretched and then subjected to UV irradiation. However, subsequent treatment of the fabrics so made is also possible. Irradiation takes place so that the threads, the fibers or the fabric, are at rest or moving, i.e., carried underneath or above the irradiation source. The length of irradiation is determined by the desired pilling effect and depends on the distance from and the intensity of the radiation source. Generally this length is from one second to thirty minutes. The distance between the irradiated sample and the radiation source is varied from five to one hundred cms. This distance depends on irradiation time and on the intensity of the source, which may be varied from 25 to 1000 watts. More intense radiation is employed where appropriate.

The radiation effectiveness suitably is ascertained by the wirekink rupture coefficient (hereinafter abbreviated as DKZ) per K. H. Gruenewald, Chemiefasern 12, 853 (1962). This coefficient represents a measure of the pilling effect and the Gruenewald article is to be consulted for further details.

The great advantage of the process of the present invention derives from the polyester viscosity falling in the ordinary range of 0.5 – 0.7 dl/gm, so that flawless melt spinning is feasible, and furthermore from the modified component being present in so minute a concentration that the polyester properties are not adversely affected.

BRIEF DESCRIPTION OF THE DRAWING

The drawing appended herewith is a graphical representation showing the DKZ dependence versus time of irradiation.

DESCRIPTION OF THE PREFERRED EMBODIMENTS

The following examples describe the invention in further detail, without however limiting it thereby.

EXAMPLE 1

The following components are introduced into an esterification reactor provided with a stirrer, a double heating jacket and a fractionating column:
1,940 gm of dimethylterephthalate (DMT)
13.4 gm of 2,4-diphenyl-cyclobutanedimethanol-1,3 (corresponding to 0.5 mole percent referred to DMT)
1,240 gm of ethyleneglycol
0.6 gm of zinc acetate.

The mixture is heated and at about 150°C, methanol begins distilling off. After methanol dissociation at 200°C has ceased, this generally will be in the case no later than after 3 hours, the esterification product is fed into the polycondensation reactor. Then,
1.2 gm of triphenylphosphate; and
0.194 gm of antimony oxide ($Sb_2O_3$)
are added. Then the temperature is continuously increased to 280°C, while gradually decreasing the pressure to about 0.1 torr (1 torr = 1 mm $H_g$). Polycondensation is stopped, when power absorption while stirring the reactor contents corresponds to a melt viscosity of about 900 poises at 285°C.

The RSV value of the colorless polyester (measured in phenol/tetrachloroethane 60/40 at 25°C) is 0.60 dl/gm and the melting point as determined from differential thermal analysis is 259°C.

The material is spun through an 8 hole spinneret, the holes being 0.25 mm in diameter, at 315°C, and the yarn is wound with a take-off speed of 640 meters/min. Thereafter the yarn is stretched at a ratio of 4:1.
Yarn properties are as follows:
titer: 36/8
tear resistance: 2.98 p/dtex
elongation: 35.7 percent The yarns subsequently are irradiated from a high pressure mercury lamp of 125 watts at a distance of 10 cm away from a time of 0–10 minutes.

The DKZ is determined at single capillaries after various times. The average values from 48 individual measurements are listed in Table 1 as a function of time of irradiation and the sequence furthermore is shown graphically in the figure of the drawing.

TABLE 1.

DKZ of polyester yarns following UV irradiation

| Time of irradiation (minutes) | 0 | 1 | 2 | 5 | 10 |
|---|---|---|---|---|---|
| DKZ (lifts) | 2,200 | 2,105 | 1,130 | 560 | 260 |

For purposes of comparison, polyester fibers with the following properties,
  titer: 36/8
  tear resistance: 3.12 p/dtex
  elongation: 35.7 percent
containing no 2,4-diphenyl-cyclobutanedimethanol-1,3 are irradiated under the same conditions. As shown by the values listed in Table 2, the DKZ decreases much more slowly than for the yarns containing 2,4-diphenyl-cyclobutanedimethanol-1,3.

TABLE 2.

| Time of irradiation (minutes) | 0 | 1 | 3 | 5 | 10 |
|---|---|---|---|---|---|
| DKZ (lifts) | 2,230 | 2,100 | 1,470 | 1,370 | 1,150 |

The decay in DKZ may be seen in the figure of the drawing.

When the ester interchange catalyst that was used is replaced by calcium or manganese acetate, or when the polycondensation catalyst that was used is replaced by germanium dioxide or gallium lactate, similar results are obtained.

When p-methoxy disubstituted 2,4-diphenyl-cyclobutanedimethanol-1.3 is used instead of 2,4-diphenyl-cyclobutanedimethanol-1.3, a similar result is obtained.

If besides the dimethylterephthalate 5, 10 or 15 mole percent of isophthalic acid dimethylester, naphthalinedicarboxylic acid-2,6-dimethylester, respectively, besides the ethyleneglycol 5, 10 or 15 mole percent of 1,4-dimethylolcyclohexane, butanediol-1,4 or neopentylglycol are used, then a comparable DKZ decay is obtained.

EXAMPLES 2 through 6

The preparation of the polyesters and yarn irradiation take place as in Example 1. The additional amount of 2,4-diphenyl-cyclobutanedimethanol-1,3 is varied. This and the other variables are listed in Table 3.

Further, the distance of the irradiated sample from the radiation source is varied from 5 to 100 cm, also the source's power. It is found that the irradiation time will be the shorter, the more powerful the source and the lesser the distance, and vice versa.

Regarding a sufficiently low pilling polyester, fewer than 1,000 lifts, preferably about 500 to 600, for yarn loading of 2 gm, are considered desirable.

TABLE 3:

DKZ as function of UV irradiation

| Example | 2,4-diphenyl-cyclobutane-dimethanol-1,3 (mole %) | Polyester melting point | RSV (dl/g) | Titer (d/tex) | Tear resistance (p/dtex) | Elongation (%) | 0 | 1 | 2 | 3 (min) | 5 | 10 | 30 |
|---|---|---|---|---|---|---|---|---|---|---|---|---|---|
| 2 | 0.1 | 256 | 0.59 | 36/8 | 3.13 | 44.2 | 2310 | 2160 | 1180 | 960 | 630 | 240 | 130 |
| 3 | 0.25 | 258 | 0.61 | 36/8 | 3.08 | 34.9 | 2250 | 2180 | 1230 | 890 | 590 | 260 | 140 |
| 1 | 0.5 | 259 | 0.60 | 36/8 | 2.98 | 35.7 | 2200 | 2105 | 1130 | — | 560 | 290 | 130 |
| 4 | 0.75 | 259 | 0.62 | 36/8 | 2.99 | 35.6 | 2240 | 2060 | 1210 | 920 | 470 | 220 | 120 |
| 5 | 1.0 | 252 | 0.59 | 36/8 | 3.04 | 35.3 | 2180 | 2020 | 1220 | 860 | 500 | 290 | 120 |
| 6 | 2.0 | 250 | 0.58 | 36/8 | 2.97 | 36.4 | 2210 | 2060 | 1150 | 820 | 560 | 240 | 130 |

We claim:
1. An improvement in the process of melt spinning ethylene terephthalate polyester to produce textile fibers having substantially decreased pilling in fabrics containing the fibers comprising melt polymerizing ethylene terephthalate in the presence of a condensation catalyst to a final temperature of about 250° to 300°C and a final pressure of less than 10 mm of mercury to form an anhydrous melt, the improvement comprising:
  conducting said melt polymerizing in the presence of about 0.05 to 5.0 mole percent of a substituted cyclobutanedimethanol;
  melt spinning said anhydrous melt; and
  exposing said melt spun fibers to irradiation with high energy light.
2. The process of claim 1, wherein said substituted cyclobutanedimethanol is 2,4-diphenyl-cyclobutanedimethanol-1,3.
3. The process of claim 2, wherein the concentration of said 2,4-diphenyl-cyclobutanedimethanol-1,3 is about 0.1 to 2.0 mole percent.
4. The process of claim 1, wherein said high energy light is ultra violet light with wave lengths of about 250 to 400 millimicrons.
5. The product obtained by the process of claim 1.
6. The process of claim 4, wherein said substituted cyclobutanedimethanol is aryl substituted.
7. The process of claim 4, wherein said substituted cyclobutanedimethanol is selected from the group consisting of 2,4-diphenyl-cyclobutanedimethanol-1,3; 3,4-diphenyl-cyclobutanedimethanol-1,2 and substituted derivatives thereof.
8. The process of claim 4, wherein said substituted cyclobutanedimethanol is 3,4-diphenyl-cyclobutanedimethanol-1,2.

* * * * *